US008195987B2

(12) United States Patent
Zeigler et al.

(10) Patent No.: US 8,195,987 B2
(45) Date of Patent: Jun. 5, 2012

(54) HANG RECOVERY IN SOFTWARE APPLICATIONS (75) Inventors: Andrew Zeigler, Seattle, WA (US);
Shawn M. Woods, Seattle, WA (US);
David M. Ruzyski, Kirkland, WA (US);
John H. Lueders, Redmond, WA (US);
Jon R. Berry, Woodinville, WA (US);
Daniel James Plaster, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 259 days.

(21) Appl. No.: 12/483,944

(22) Filed: Jun. 12, 2009

(65) Prior Publication Data
US 2010/0318832 A1 Dec. 16, 2010

(51) Int. Cl.
G06F 11/00 (2006.01)
(52) U.S. Cl. ............................................. 714/55; 714/51
(58) Field of Classification Search ............ 714/2, 38.1, 714/38.11, 38.12, 38.13, 38.14, 51, 55, 10
See application file for complete search history.

(56) References Cited

U.S. PATENT DOCUMENTS

| 5,864,656 | A  | * | 1/1999  | Park .................................. 714/10 |
| 6,012,154 | A  | * | 1/2000  | Poisner ............................. 714/55 |
| 6,662,310 | B2 | * | 12/2003 | Lopez et al. ..................... 714/15 |
| 6,850,257 | B1 |   | 2/2005  | Colleran et al. |
| 7,149,928 | B2 |   | 12/2006 | van Os |
| 7,225,361 | B2 | * | 5/2007  | Cobb et al. .................. 714/38.13 |
| 7,318,171 | B2 |   | 1/2008  | Rothman et al. |
| 7,490,319 | B2 |   | 2/2009  | Blackwell et al. |
| 2006/0230321 | A1 | * | 10/2006 | Cummins et al. ............... 714/46 |
| 2008/0046782 | A1 |   | 2/2008  | Betancourt et al. |
| 2008/0256539 | A1 |   | 10/2008 | Barde et al. |
| 2009/0037557 | A1 |   | 2/2009  | Seger |

OTHER PUBLICATIONS

Nakka, Nithin Manikyam; "Reliability and Security Engine: A Processor-Level Framework for Application-Aware Detection and Recovery;" May 2007; UMI ProQuest Dissertations & Theses; pp. 69-87 and 129-132.*
"WerReportHang Function", Retrieved at<< http://msdn.microsoft.com/en-us/library/bb892080(VS.85).aspx>>, Jan. 15, 2009, pp. 1-2.
Reis, et al., "Isolating Web Programs in Modern Browser Architectures", Retrieved at<< http://www.cs.washington.edu/homes/creis/publications/eurosys-2009.pdf >>, Apr. 1-3, 2009, Nuremberg, Germany., pp. 13.
"Root Out Elusive Production Bugs with These Effective Techniques", Retrieved at<< http://msdn.microsoft.com/en-us/magazine/cc163760.aspx>>, Apr. 1, 2009, pp. 1-10.
"How Windows Error Reporting Works", Retrieved at<< http://www.microsoft.com/whdc/maintain/WER/WERWorks. mspx>>, pp. 1.
Fox, et al., "Detecting Application-Level Failures in Component-based Internet Services", Retrieved at<<http://www.cc.gatech.edu/~isbell/classes/reading/papers/emre.pdf>>, pp. 1-15.

* cited by examiner

*Primary Examiner* — Robert Beausoliel, Jr.
*Assistant Examiner* — Joseph Kudirka (57) ABSTRACT Various embodiments provide a guard mechanism that is configured to prevent transmission of synchronous function calls to hung application components. In at least some embodiments, the guard mechanism receives a synchronous function call that is intended for an application component. Before permitting the synchronous function call to be transmitted to the application component, the guard mechanism determines whether the component is hung. Responsive to determining that the component is not hung, the guard mechanism permits the synchronous function call to be transmitted to the component. If, however, the guard mechanism determines that the application component is hung, a hung component recovery process is initiated.

20 Claims, 5 Drawing Sheets

HANG RECOVERY IN SOFTWARE APPLICATIONS

BACKGROUND

Many computer applications contain unreliable components, often times in the form of binary extensions or third party code. An application that hosts unreliable components may be subject to reliability characteristics of the unreliable component. Consider, for example, a web browser application (e.g. Internet Explorer® by Microsoft Corporation) that may be configured to navigate a wide variety of different content available via the Internet (e.g. web pages, music, online videos) and display this content in one or more separate web browser windows, or "tabs". In some instances, this Internet content may be configured as extension code which can extend the function of the web browser application itself (e.g. "plug-ins", "third-party plug-ins", "add-ons"). This extension code, however, may have an adverse effect on the execution of the web browser application, even to the point of failure.

Consider, for example, a browser application that receives a third-party component (e.g. third-party plug-in) to expand the functionality of the browser application. Because it is a third-party component, it may be written according to quality standards that do not meet the standards of a writer of the browser application. Accordingly, the component may fail when executed in conjunction with the browser application. Because the component is extension code that may share resources with the browser application, failure of the component may cause failure of the browser application, such as a crash or a "hang". Oftentimes, components may be displayed as tabs within the browser application, each being executed as a separate component. Failure of one tab, in this instance, may cause other components displayed as tabs to fail as well.

In addition to web browser applications, some computer applications may be configured with a multiple document interface that hosts multiple copies of itself for each open document. Consider, for example, the program Excel® by Microsoft Corporation, which may include multiple open spreadsheet documents at one time. If code that is hosting one of these documents fails, all of the other documents in the application may fail as well.

Some computer applications can be isolated into multiple components so that when one component experiences a failure, the impact of the failure can be limited to that component. Thus, if one component experiences a failure, the application can continue to execute by isolating and terminating the single failed component.

Even applications that can be isolated into multiple components, however, may be susceptible to crashing when a synchronous function call is placed to an unresponsive or hung component because synchronous function calls may block execution of the entire application until the application component responds to the function call. For instance, if a synchronous function call is placed to a hung component, the hung component will be unable to respond to the function call which may cause the entire application to hang awaiting a response from the component.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments provide a guard mechanism that is configured to prevent transmission of synchronous function calls to hung application components. In at least some embodiments, the guard mechanism receives a synchronous function call that is intended for an application component. Before permitting the synchronous function call to be transmitted to the application component, the guard mechanism determines whether the component is hung. Responsive to determining that the component is not hung, the guard mechanism permits the synchronous function call to be transmitted to the component. If, however, the guard mechanism determines that the application component is hung, a hung component recovery process is initiated.

In at least one embodiment, a polling mechanism can be used in conjunction with the guard mechanism and is configured to continuously determine whether application components are hung.

BRIEF DESCRIPTION OF THE DRAWINGS

The same numbers are used throughout the drawings to reference like features.

DETAILED DESCRIPTION

Overview

Various embodiments provide a guard mechanism that is configured to prevent transmission of synchronous function calls to hung application components. In at least some embodiments, the guard mechanism receives a synchronous function call that is intended for an application component. Before permitting the synchronous function call to be transmitted to the application component, the guard mechanism determines whether the component is hung. Responsive to determining that the component is not hung, the guard mechanism permits the synchronous function call to be transmitted to the component. If, however, the guard mechanism determines that the application component is hung, a hung component recovery process is initiated, and the hung component is terminated.

In at least some embodiments, the guard mechanism determines whether an application component is hung by transmitting an asynchronous message (e.g., a "ping") to the component that requests a response within a first wait time. If the component responds to the message within the first wait time indicating that the component is not hung, the guard mechanism permits the synchronous function call to be transmitted to the component.

If, however, the component does not quickly respond to the message, the guard mechanism starts a timeout timer for a second wait time. If the component responds to the message before the timeout timer expires, the guard mechanism permits the synchronous function call to be transmitted to the component. However, if the timeout timer expires and the component has not responded to the message, indicating that the component is hung, the hung component recovery process is initiated and the hung component can be terminated.

In at least some embodiments, a polling mechanism can be used in conjunction with the guard mechanism and is configured to continuously determine whether application components are hung. When the polling mechanism determines that an application component is hung, the polling mechanism initiates a hung component recovery process. If, however, the polling mechanism determines that the application component is not hung, the polling mechanism is configured to determine whether a next application component is hung, and the process repeats itself.

In the discussion that follows, a section entitled "Operating Environment" describes but one operating environment that can be utilized to practice the inventive principles described herein in accordance with one or more embodiments. Following this, a section entitled "Guard Mechanism" is provided and describes an example guard mechanism. Next, a section entitled "Example Methods" describes example methods in accordance with one or more embodiments. Next, a section entitled "Implementation Example" is provided and describes an example application that is resistant to hangs. Last, a section entitled "Example System" describes an example system that can be utilized to implement the described embodiments.

Operating Environment

Figure 1:
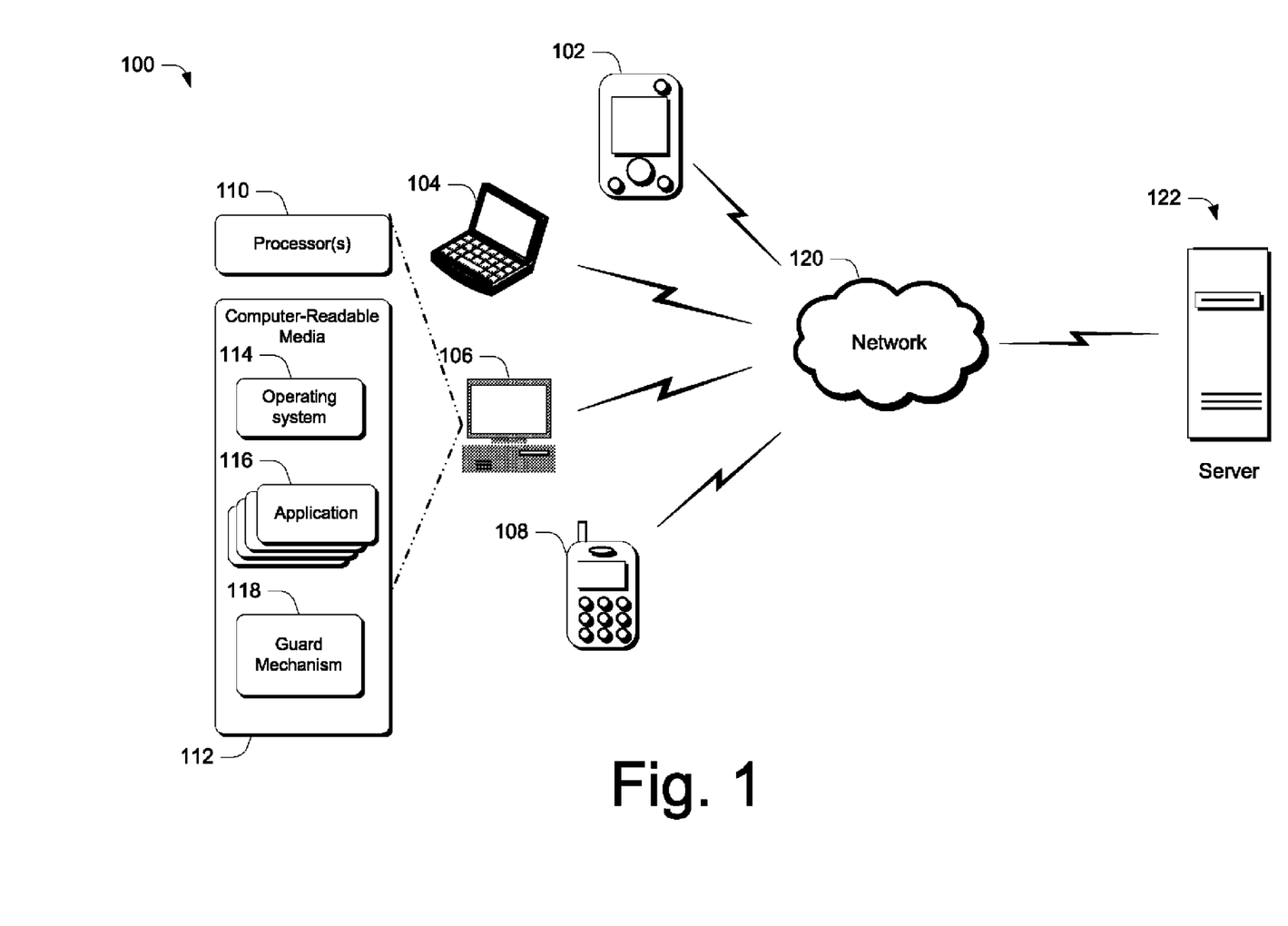
FIG. 1 illustrates an operating environment in accordance with one or more embodiments.

FIG. 1 illustrates an operating environment in accordance with one or more embodiments, generally at 100. Operating environment 100 includes multiple different computing devices, examples of which are shown at 102, 104, 106, and 108. The computing devices can be used to process and store pieces of information. Individual computing devices can typically include one or more processors 110, one or more computer-readable media 112, an operating system 114, one or more application(s) 116 that reside on the computer-readable media and which are executable by the processor(s), and a guard mechanism 118. Guard mechanism 118 can be used to prevent the transmission of synchronous function calls to hung application components, as will become apparent below.

The computer-readable media can include, by way of example and not limitation, all forms of volatile and non-volatile memory and/or storage media that are typically associated with a computing device. Such media can include ROM, RAM, flash memory, hard disk, removable media and the like.

In addition, in at least some embodiments, environment 100 includes a network 120, such as a local network or the Internet, via which information can be requested and sent. Operating environment 100 also includes, in at least some embodiments, a server 122. Server 122, like the individual computing devices, may be used to process and store pieces of information The computing devices can be embodied as any suitable computing device such as, by way of example and not limitation, a desktop computer (such as computing device 106), a portable computer (such as computing device 104), a handheld computer such as a personal digital assistant (such as computing device 102), a cell phone (such as computing device 108), and the like.

Having discussed the general notion of an example operating environment in which various embodiments can operate, consider now a more detailed discussion of a guard mechanism in accordance with one or more embodiments.

Guard Mechanism

As noted above, the guard mechanism is configured to prevent transmission of synchronous function calls to hung application components that are unable to respond to function calls. Application components may be prone to hanging because they often include third-party plug-ins and/or extension code. When a synchronous function call is sent to an application component, the function call may block execution of the application until a response is received from the component. Therefore, when a synchronous function call is received by a hung application component, the entire application can hang awaiting a response from the component that may never be sent. Accordingly, by preventing the transmission of synchronous function calls to hung application components, the guard mechanism can prevent applications from hanging.

In accordance with various embodiments, the guard mechanism is configured to receive a synchronous function call intended for an application component. Responsive to receiving the synchronous function call, the guard mechanism is configured to determine whether the component is hung. If it is determined that the application component is not hung, then the guard mechanism permits the synchronous function call to be transmitted to the component. If, however, it is determined that the component is hung, then the guard mechanism initiates a hung component recovery process, which is discussed in more detail below.

Having considered an example operating environment, consider now some example methods that the guard mechanism can implement to prevent the transmission of synchronous function calls to hung application components, in accordance with one or more embodiments.

Example Methods

Figure 2:
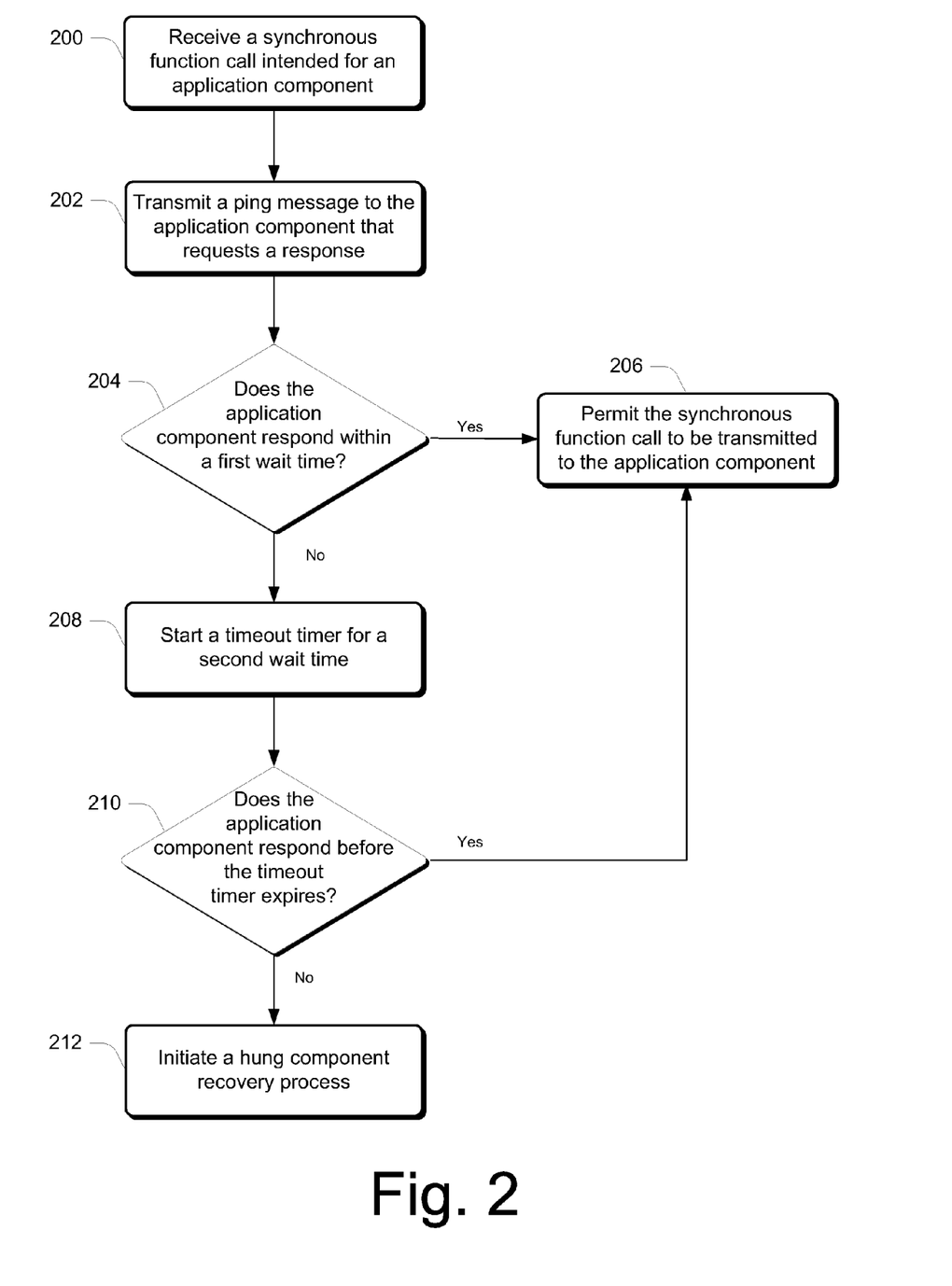
FIG. 2 is a flow diagram that describes steps in a method in accordance with one or more embodiments.

FIG. 2 is a flow diagram that describes steps in a method in accordance with one or more embodiments. The method can be implemented in connection with any suitable hardware, software, firmware, or combination thereof. In at least some embodiments, aspects of the method can be performed by a guard mechanism, such as guard mechanism 118, executing on a computing device or on a server, such as the computing devices and server illustrated in FIG. 1.

Step 200 receives a synchronous function call intended for an application component. For example, guard mechanism 118 may be configured to receive or intercept a synchronous function call in order to prevent transmission of the synchronous function call to a hung application component.

Step 202 transmits a ping message to the application component that requests a response. For example, guard mechanism 118 may transmit a ping message to the application component to ensure that the component is not currently hung. The ping message requests a response that verifies that the component is not hung. In at least some embodiments, the ping message comprises an asynchronous message so that, in the event that the component is hung, the ping message will not cause the application to hang like the transmission of a synchronous message to a hung component could. In addition, if a component is hung, and subsequently becomes responsive, the component will be able to respond to the asynchronous message.

Step 204 determines whether the application component responds to the ping message within a first wait time. In accordance with various embodiments, the guard mechanism may be configured to wait just a short period of time for a response to the ping message from the application component. This first wait time may be unnoticeable to a user of the computing device (e.g. 50 ms). If a response, acknowledging receipt of the ping message is received within the first wait time, then the guard mechanism knows that the component is not hung, and permits the synchronous function call to be transmitted to the application component at step 206.

If, however, the guard mechanism does not receive a response from the application component within the first wait time, then step 208 starts a timeout timer that is configured to expire after a second wait time. In at least some embodiments the second wait time is longer than the first wait time (e.g. 5 seconds) and may be noticeable to a user of the computing device. The timeout timer provides the hung application component with some additional time to become responsive, instead of immediately initiating a hung component recovery process and/or terminating the hung component when a response to the ping message is not quickly received within the first wait time.

The guard mechanism, in combination with starting the timeout timer, may also record that the synchronous function call needs to be performed to ensure that the synchronous function call can be transmitted to the application component in the event that the component subsequently becomes responsive.

Step 210 determines whether the application component responds before the timeout timer expires. If the application component responds to the ping message before the timeout timer expires, then the guard mechanism permits the synchronous function call to be transmitted to the application component at step 206.

If, however, the application component does not respond before the timeout timer expires, then step 212 initiates a hung component recovery process. The hung component recovery process can be implemented in any suitable way. For example, in at least some embodiments a recovery store, discussed in more detail below, is configured to include various code to implement the hung component recovery process. In at least some embodiments, the hung component recovery process may notify a user of the application that an application component is hung. For example, a dialog box may be displayed to provide a notification that the component is not responding. The dialog box may also present a user with one or more options, such as an option to close down or terminate the hung component or wait longer for the component to become responsive. It is to be appreciated, however, that there are a variety of ways in which a user can be notified of a hung component.

In at least one embodiment, a polling mechanism can be used in conjunction with the guard mechanism. The polling mechanism is configured to determine whether an application component is hung. Responsive to determining that the application component is hung, the polling mechanism initiates a hung component recovery process. If, however, the polling mechanism determines that the application component is not hung, the polling mechanism can continue polling additional application components to determine whether a next application component or additional application components is (are) hung. It is to be appreciated, therefore, that the polling mechanism operates like the guard mechanism except that it does not wait for a synchronous function call to be placed to a component.

Figure 3:
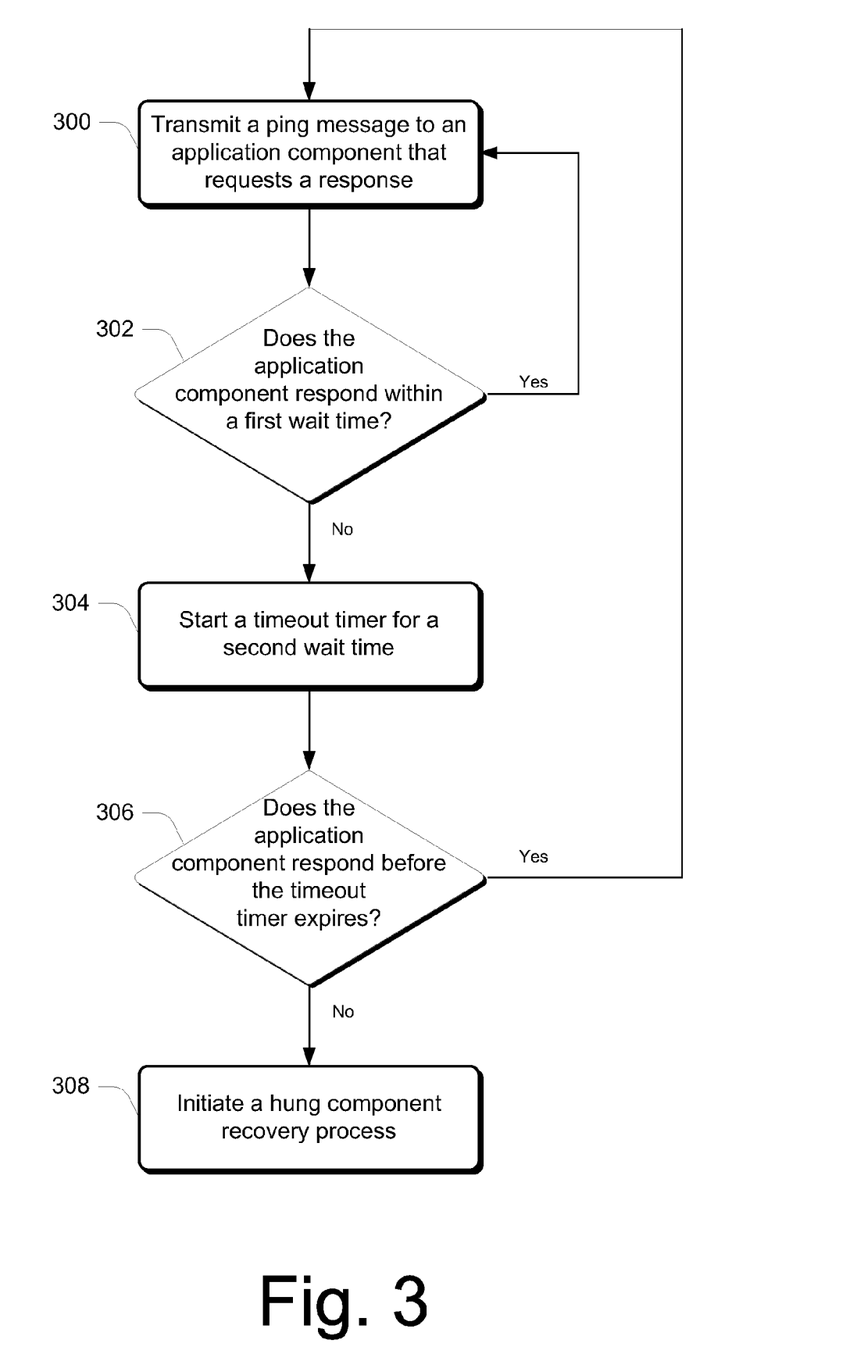
FIG. 3 is a flow diagram that describes steps in a method in accordance with one or more embodiments.

FIG. 3 is a flow diagram that describes steps in a method in accordance with one or more embodiments. The method can be implemented in connection with any suitable hardware, software, firmware, or combination thereof. In at least some embodiments, aspects of the method can be performed by a polling mechanism that can be used in conjunction with the guard mechanism, such as guard mechanism 118 of FIG. 1.

Step 300 transmits a ping message to an application component that requests a response. For example, the polling mechanism may transmit a ping message to an application component to ensure that the component is not currently hung. The ping message requests a response that verifies that the component is not hung. As discussed above with regards to FIG. 2, in at least some embodiments, the ping message comprises an asynchronous message.

Step 302 determines whether the application component responds to the ping message within a first wait time. In accordance with various embodiments, the polling mechanism is configured to wait just a short period of time for a response. If a response, acknowledging receipt of the ping message is received within the first wait time, then the polling mechanism knows that the component is not hung. The method is then repeated by transmitting a ping message to a next application component at step 300 to determine whether the next application component is hung.

If, however, the polling mechanism does not receive a response from the application component within the first wait time, then step 304 starts a timeout timer that is configured to expire after a second wait time. In at least some embodiments the second wait time is longer than the first wait time.

Step 306 determines whether the application component responds before the timeout timer expires. If the application component responds before the timeout timer expires, then the method is repeated by transmitting a ping message to a next application component at step 300. If, however, the application component does not respond before the timeout timer expires, then step 308 initiates a hung component recovery process that is analogous to the hung component recovery process discussed above. The method can then return to step 300 to continue polling additional application components.

Accordingly, the polling mechanism can identify and terminate hung components before or independent of whether a synchronous function call is transmitted to a hung component. It is to be appreciated that in at least some embodiments the guard mechanism and the polling mechanism can work in combination to prevent synchronous function calls from being received by hung components.

Having discussed examples of a guard mechanism and a polling mechanism, consider now an implementation example.

Implementation Example

In accordance with various embodiments, the guard mechanism and/or the polling mechanism can be configured to operate in a hang resistant layer of an application. In at least some embodiments, the hang resistant layer can be implemented between a frame process of an application and one or more application components. An application's frame process is responsible for managing the base functionality of the application and is generally trusted. In contrast, application components may be unreliable and/or untrusted because they often include third party plug-ins and/or extension code.

Consider, for example, an Internet browser application that includes a frame process configured to manage the base functionality of the browser, such as the controls of the browser used to navigate through web pages (e.g., "back" and "forward" buttons, an address bar that accepts as input a uniform resource locator (URL) address, or a "refresh" button).

The browser application may also support application components, such as third party plug-ins and extension code that are received from navigating various web pages. These components, for instance, may be displayed as tabs within the browser application, each being executed as a separate component. However, these components may be unreliable and therefore may be more susceptible to failure or hanging. If a synchronous function call is placed from the frame process of the application to a hung component, the entire browser application may hang awaiting a response from the hung component. Accordingly, a guard mechanism such as guard mechanism 118 of FIG. 1, operating in a hang resistance layer, can be configured to prevent the transmission of synchronous function calls from the frame process of an application to the application components, as discussed above.

Figure 4:
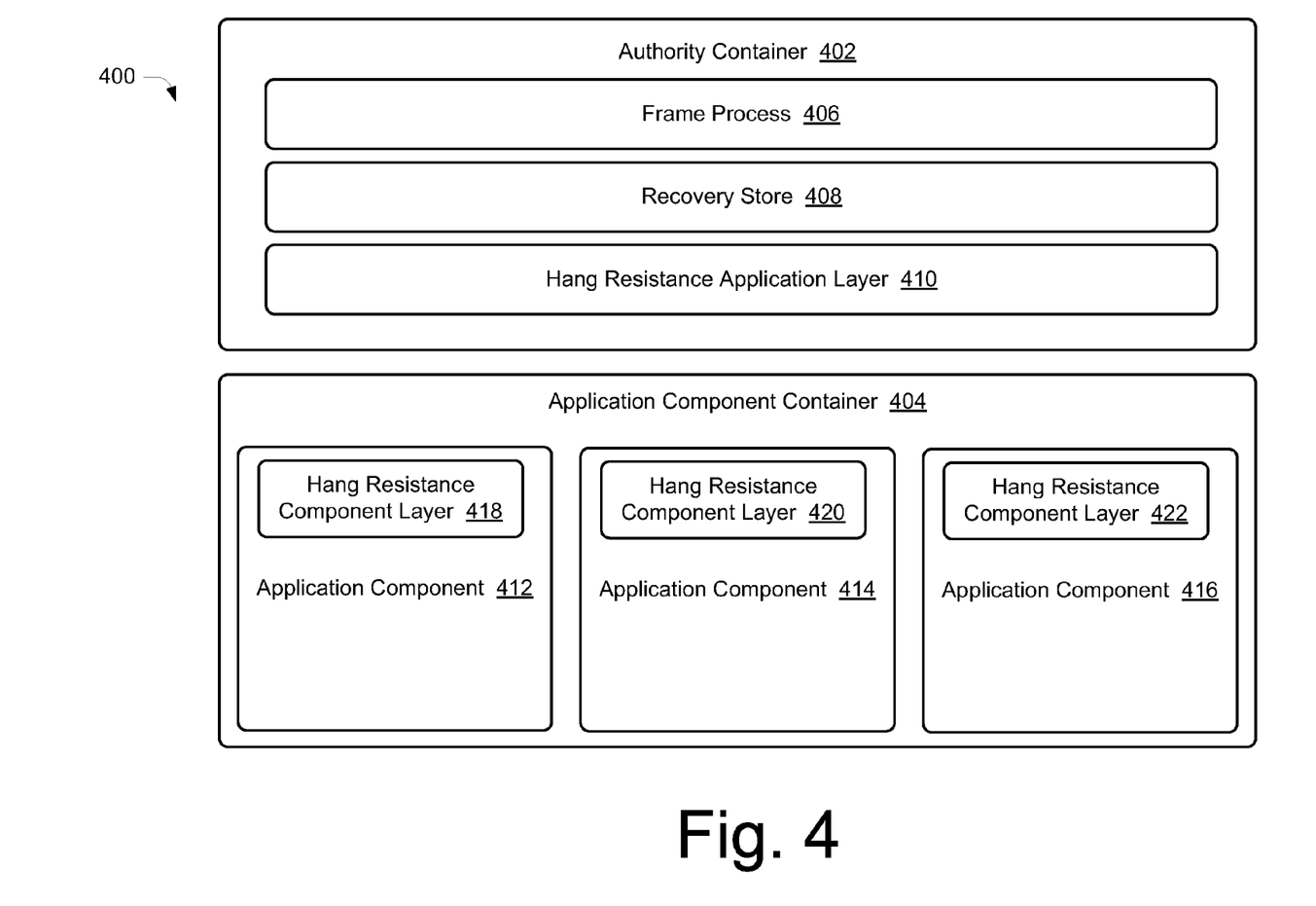
FIG. 4 illustrates an example application that is resistant to hangs in accordance with one or more embodiments.

FIG. 4 illustrates an example application 400, in accordance with one or more embodiments, that can be executed by any of the multiple computing devices 102, 104, 106, and/or 108 or on server 122, depicted in FIG. 1.

Application 400 includes an authority container 402 and an application component container 404. Authority container 402 includes a frame process 406, a recovery store 408, and a hang resistance application layer 410. Frame process 406 comprises the application's frame process that is devoid of any third party or unreliable code, such as the frame process of an Internet browser that is responsible for managing base functionality of the browser.

Application component container 404 can include one or more application components 412, 414, and 416. Each of components 412, 414, and 416 includes a hang resistance component layer 418, 420, and 422, respectively. The components may comprise any type of application component that can be isolated into a separate process. In at least one embodiment, components 412, 414, and 416 comprise third party plug-ins and extension code that may be received from navigating various web pages and are displayed as tabs within the browser application.

While components 412, 414, and 416 are illustrated as separate components within a single component container, it is to be appreciated that any combination of components and component containers can be used. In addition, in at least some embodiments, application component container 404 may include an additional hang resistance container layer that is configured to communicate with the hang resistance application layer 410 as well as the hang resistance component layer of one or more components in the application component container.

Frame Process 406 is configured to communicate with components 412, 414, and 416 through a series of asynchronous or synchronous function calls. As discussed throughout, if a synchronous function call is received by a hung component, the entire application may hang awaiting a response from the component.

In accordance with various embodiments, hang resistance application layer 410 and hang resistance component layers 418, 420, and 422, in combination, comprise a hang resistance layer. In at least some embodiments, a guard mechanism, such as guard mechanism 118 of FIG. 1, is implemented in the hang resistance layer and is configured to prevent frame process 406 from sending synchronous function calls to application components 412, 414, or 416 that are unresponsive or hung, as described in FIG. 2.

Consider, for example, that frame process 406 transmits a synchronous function call to application component 412. Hang resistance application layer 410 is configured to receive or intercept the synchronous function call, as described in step 200 of FIG. 2. Responsive to receiving the synchronous function call, hang resistance application layer 410 can transmit a ping message to hang resistance component layer 418, as described at step 202 of FIG. 2.

Hang resistance component layer 418 is configured to receive the ping message. If component 412 is not hung, then hang resistance component layer 418 can transmit a response to hang resistance application layer 410 indicating that component 412 is responsive. The hang resistance application layer can then permit transmission of the synchronous message to component 412, as described at step 206 of FIG. 2.

If, however, component 412 is hung, then hang resistance component layer 418 will be unable to transmit a response back to the hang resistance application layer. If the hang resistance application layer does not receive a response from the hang resistance component layer within a first wait time, then the hang resistance application layer starts a timeout timer, as described at step 208 of FIG. 2. If component 412 subsequently becomes responsive, then hang resistance component layer 418 responds to the ping message, and the hang resistance application layer permits transmission of the synchronous message to component 412, as described at step 206 of FIG. 2.

If, however, component 412 does not become responsive before the timeout timer expires, then hang resistance application layer 410 initiates a hung component recovery process, as described at step 212 of FIG. 2. To initiate the hung component recovery process, application layer 410 transmits information about the hung component to recovery store 408.

Recovery store 408 is configured to store component state-specific data and code that can be used to implement the hung component recovery process. In at least some embodiments, the hung component recovery process may notify a user of the application that an application component is hung. In the web browser example, discussed above, the tab used to display the hung component may be "ghosted" (e.g. a white box is drawn over the web browser window tab) to provide a visual indication that the component is hung. Alternately or additionally, a dialog box may be displayed to provide a notification that the component is not responding. The dialog box may also present a user with one or more options, such as an option to close down or terminate the hung component or wait longer for the component to become responsive. It is to be appreciated, however, that there are a variety of ways in which a user can be notified of a hung component.

Recovery store 408 may also include code that can be used to terminate the hung component as well as any other responsive components and open a new set of components. Closing and restarting all of the components, even those that are not hung, enables more data about the hang to be collected. This data can then be provided to an application developer, who can use the data to troubleshoot the hang. In other embodiments, however, just the hung component may be terminated and restarted.

Recovery store 408 may also include code to that can be used in the event that a hung component becomes responsive after the hung component recovery process has started. For example, if component 412 responds to the ping message after the hung component recovery process has begun, the tab used to display the hung component can be un-ghosted and/or a dialog box indicating that the hung component has become responsive can be presented to a user.

Having discussed an implementation example, consider now a discussion of an example system that can be used to implement one or more embodiments.

Example System

Figure 5:
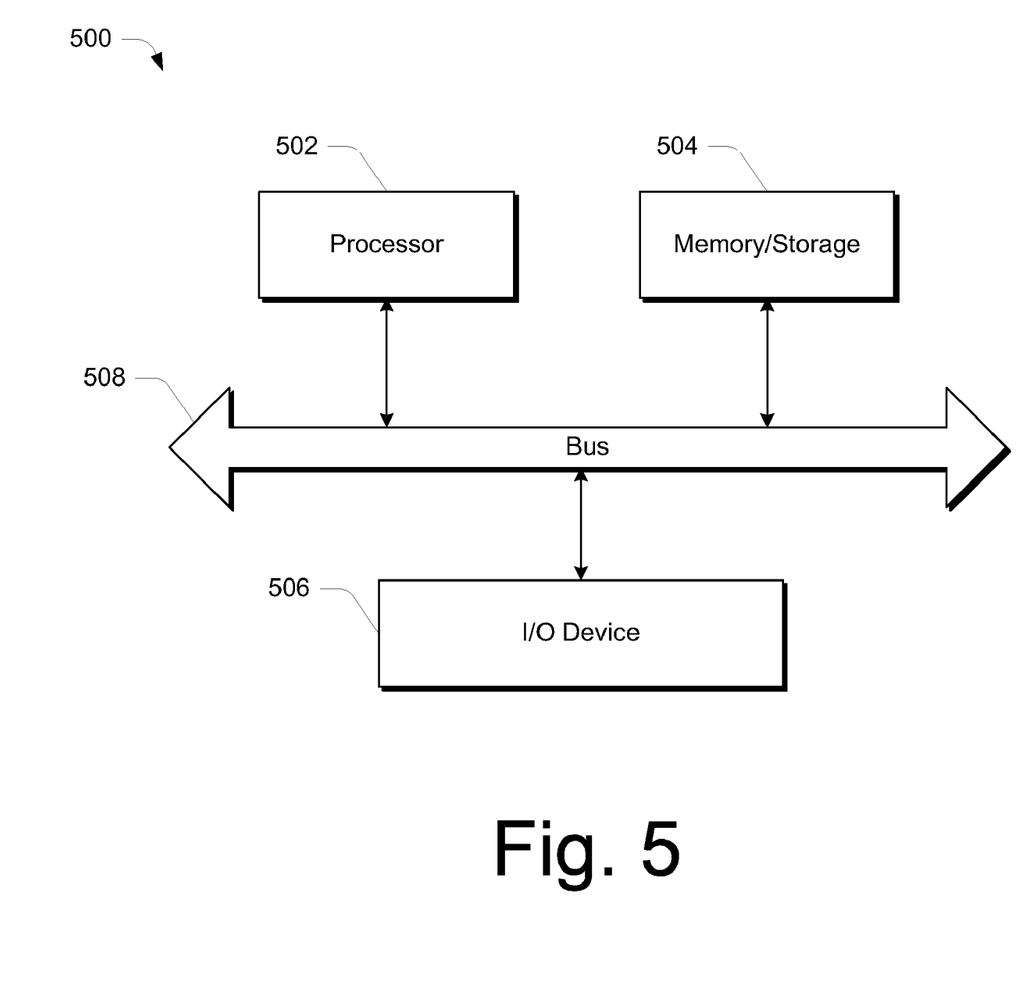
FIG. 5 is a block diagram of an example system that can be utilized to implement one or more embodiments.

FIG. 5 illustrates an example computing device 500 that can implement the various embodiments described above. Computing device 500 can be, for example, various computing devices or servers, such as those illustrated in FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments described above provide a guard mechanism that is configured to prevent transmission of synchronous function calls to hung application components. In at least some embodiments, the guard mechanism receives a synchronous function call that is intended for an application component. Before permitting the synchronous function call to be transmitted to the application component, the guard mechanism determines whether the component is hung. Responsive to determining that the component is not hung, the guard mechanism permits the synchronous function call to be transmitted to the component. If, however, the guard mechanism determines that the application component is hung, a hung component recovery process is initiated.

In at least one embodiment, a polling mechanism can be used in conjunction with the guard mechanism and is configured to continuously determine whether application components are hung.

Although the subject matter has been described in language specific to structural features and/or methodological steps, it is to be understood that the subject matter defined in the appended claims is not necessarily limited to the specific features or steps described. Rather, the specific features and steps are disclosed as example forms of implementing the claimed subject matter.

What is claimed is:

1. A computer-implemented method comprising:
   intercepting, by a hang resistance application layer associated with an application, a synchronous function call intended for an application component of the application to prevent transmission of the synchronous function call to the application component if the application component is hung;
   responsive to intercepting the synchronous function call, transmitting a message other than the synchronous function call from the hang resistance application layer associated with the application to the application component that requests a response to be received before transmission of the synchronous function call to the application component is permitted;
   permitting the synchronous function call to be transmitted to the application component if the application component responds to the message within a first wait time;
   starting a timeout timer that is configured to expire after a second wait time if the application component does not respond within the first wait time;
   permitting the synchronous function call to be transmitted to the application component if the application component responds to the message before the timeout timer expires; and
   initiating a hung component recovery process if the application component does not respond to the message before the timeout timer expires.

2. The computer-implemented method as recited in claim 1, wherein the synchronous function call is received from a frame process of a web browser application, and wherein the application component is associated with a tab of the web browser application.

3. The computer-implemented method as recited in claim 2, wherein initiating the hung component recovery process comprises at least one of:
   ghosting the tab of the web browser application; or
   causing display of a dialog box configured to indicate that the application component associated with the tab is unresponsive.

4. The computer-implemented method as recited in claim 1, wherein the message comprises an asynchronous message.

5. The computer-implemented method as recited in claim 1, wherein the second wait time is longer than the first wait time.

6. One or more computer-readable storage media embodying computer executable instructions, which when executed by one or more processors perform a method, comprising:
   intercepting, by a hang resistance application layer associated with an application, a synchronous function call intended for an application component of the application to prevent transmission of the synchronous function call to the application component if the application component is hung;
   responsive to intercepting the synchronous function call, determining whether the application component is hung by transmitting a message, other than the synchronous function call, from the hang resistance application layer associated with the application to the application component that requests a response to be received before transmission of the synchronous call to the application component is permitted;

permitting the synchronous call to be transmitted to the application component responsive to determining that the application component is not hung; and initiating a hung component recovery process responsive to determining that the application component is hung.

7. One or more computer-readable storage media as recited in claim 6, wherein the synchronous function call is received from a frame process of a web browser application, and wherein the application component is associated with a tab of the web browser application.

8. One or more computer-readable storage media as recited in claim 7, wherein initiating the hung component recovery process comprises at least one of:

ghosting the tab of the web browser application; or causing display of a dialog box configured to indicate that the application component associated with the tab is unresponsive.

9. One or more computer-readable storage media as recited in claim 6, wherein determining whether the application component is hung comprises:

transmitting the message to the application component that requests a response within a first wait time, and determining that the application component is not hung if the application component responds to the message within the first wait time;

starting a timeout timer that is configured to expire after a second wait time if the application component does not respond within the first wait time, and determining that the application component is not hung if the application component responds to the message before the timeout timer expires; and determining that the application component is hung if the application component does not respond to the message before the timeout timer expires.

10. One or more computer-readable storage media as recited in claim 9, wherein the message comprises an asynchronous message.

11. One or more computer-readable storage media as recited in claim 9, wherein the second wait time is longer than the first wait time.

12. One or more computer-readable storage media embodying computer executable instructions that implement an architecture comprising:

an application comprising a frame process and one or more application components, the frame process configured to communicate with the one or more application components to ascertain whether any of the application components are hung; and a hang resistance application layer associated with the application and configured to:

intercept synchronous function calls from the frame process to the one or more application components to prevent transmission of the synchronous function calls to the one or more application components when the one or more application components are hung;

prevent transmission of the synchronous function calls from the frame process to one or more hung application components in response to intercepting the synchronous function calls by transmitting a message other than the synchronous function calls to the one or more application components that requests a response to be received before transmission of the synchronous function calls to the one or more application components is permitted; and permit transmission of the synchronous function calls from the frame process to the one or more application components when the one or more application components are ascertained to not be hung.

13. One or more computer-readable storage media as recited in claim 12, wherein the hang resistance application layer is configured to prevent the transmission of synchronous function calls by:

determining whether an application component is hung;

initiating a hung component recovery process responsive to determining that the application component is hung; and determining whether one or more next application components are hung.

14. One or more computer-readable storage media as recited in claim 13, wherein the application comprises a web browser application.

15. One or more computer-readable storage media as recited in claim 14, wherein the application component is associated with a tab of the web browser application.

16. One or more computer-readable storage media as recited in claim 15, wherein initiating the hung component recovery process comprises at least one of:

ghosting the tab of the web browser application; or causing display of a dialog box configured to indicate that the component associated with the tab is unresponsive.

17. One or more computer-readable storage media as recited in claim 12, wherein the hang resistance application layer is configured to prevent the transmission of synchronous function calls by:

receiving a synchronous function call from the frame process that is intended for an application component;

determining whether the application component for which the call is intended is hung;

permitting the synchronous function call to be transmitted to the application component for which the call is intended responsive to determining that the application component for which the call is intended is not hung; and initiating a hung component recovery process responsive to determining that the application component for which the call is intended is hung.

18. One or more computer-readable storage media as recited in claim 17, wherein determining whether the application component is hung comprises:

transmitting a message to the application component that requests a response within a first wait time, and determining that the application component is not hung if the application component responds to the message within the first wait time;

starting a timeout timer configured to expire after a second wait time if the application component does not respond within the first wait time, and determining that the application component is not hung if the application component responds to the message before the timeout timer expires; and determining that the application component is hung if the application component does not respond to the message before the timeout timer expires.

19. One or more computer-readable storage media as recited in claim 18, wherein the message comprises an asynchronous message.

20. One or more computer-readable storage media as recited in claim 18, wherein the second wait time is longer than the first wait time.

* * * * *